United States Patent [19]

Simmons

[11] 4,144,013
[45] Mar. 13, 1979

[54] INJECTION BLOW MOLDING METHOD AND APPARATUS

[75] Inventor: John B. Simmons, Wigan, Northern Ireland

[73] Assignee: Dart Industries Inc., Los Angeles, Calif.

[21] Appl. No.: 856,813

[22] Filed: Dec. 1, 1977

[51] Int. Cl.² .................................................. B29D 23/03
[52] U.S. Cl. ..................................... 425/533; 425/534; 264/513; 264/539
[58] Field of Search ............... 425/526, 530, 533, 534; 264/97

[56] References Cited

U.S. PATENT DOCUMENTS

| | | | |
|---|---|---|---|
| 3,836,304 | 9/1974 | Johnson | 425/533 |
| 3,928,522 | 12/1975 | Farrell | 425/530 X |
| 3,979,491 | 9/1976 | Zavasnik | 425/533 |
| 3,981,668 | 9/1976 | Farrell | 425/530 X |

Primary Examiner—Richard B. Lazarus
Attorney, Agent, or Firm—Paul R. Wylie, Jr.; Leigh B. Taylor; Kenneth J. Hovet

[57] ABSTRACT

A method and apparatus of injection blow molding containers utilizing injection and blow mold members opening on horizontal parting lines wherein the core pins are moved radially and wherein the core pins are first positioned in a lower half of the mold and sequentially the upper half if closed upon the pin when closing the molds. Provision is made for an auxiliary work station to supplement the capabilities of the apparatus.

6 Claims, 9 Drawing Figures

INJECTION BLOW MOLDING METHOD AND APPARATUS

BACKGROUND OF THE INVENTION

Various blow molding processes are in commercial use for the production of plastic containers, e.g., bottles or the like. One of the difficulties encountered in existing blow molding processes is the possibility of misalignment of the core pins when such pins are being positioned in the molds. Another difficulty in existing injection blow molding techniques is relatively limited versatility of the equipment and/or processes insofar as their adaptability to produce a variety of different blow molded products without major modifications.

BRIEF SUMMARY OF THE INVENTION

In accordance with this invention, some of the above noted disadvantages of existing blow molding techniques have been eliminated by providing a versatile and trouble-free method and apparatus for forming containers of plastic material by the injection blow molding method.

In one aspect of the invention, there is provided a method of forming a container of plastic material by injection blow molding utilizing injection and blow molds of the type having two sections adapted to be separated from each other along a horizontal parting line when the molds are in an open position whereby the core pins can be moved radially to and from injection, blow and stripping stations in a substantially horizontal plane.

A feature of the invention is a sequential technique for opening and closing the mold wherein the core pins are first aligned with the mold members when the mold members are in an open position and then the core pin is moved in a vertical direction to contact one of said sections, following which the other of said sections is moved in a vertical direction to close the mold. When opening the mold, these steps are repeated in reverse, namely, one of the mold sections is moved in a vertical direction and then the core pin is moved in a vertical direction to a point between the mold sections where it can be moved radially to the next station.

As another feature of the invention, there is provided a method and apparatus wherein an auxiliary or extra, station is provided to add versatility to the type of products made by the injection blow molding machine without major alterations of equipment or processes and without presenting serious disadvantages when the auxiliary station is not used. According to this feature of the invention, there can be provided means for controlling the environment and ambient air conditions around said molding stations and said auxiliary station whereby a parison, being positioned at said auxiliary station, when such station is not in use, will be maintained at the optimum conditions for a successful blow molding step. This feature provides added versatility to the injection blow molding apparatus contemplated herein inasmuch as the apparatus can be fitted with supplementary equipment at the auxiliary station if desired, while the lack of such equipment will not interfere with processing techniques where such equipment is not required.

BRIEF DESCRIPTION OF THE DRAWINGS

The invention will be more fully understood with reference to the drawings in which.

DETAILED DESCRIPTION OF THE INVENTION

Figure 1:
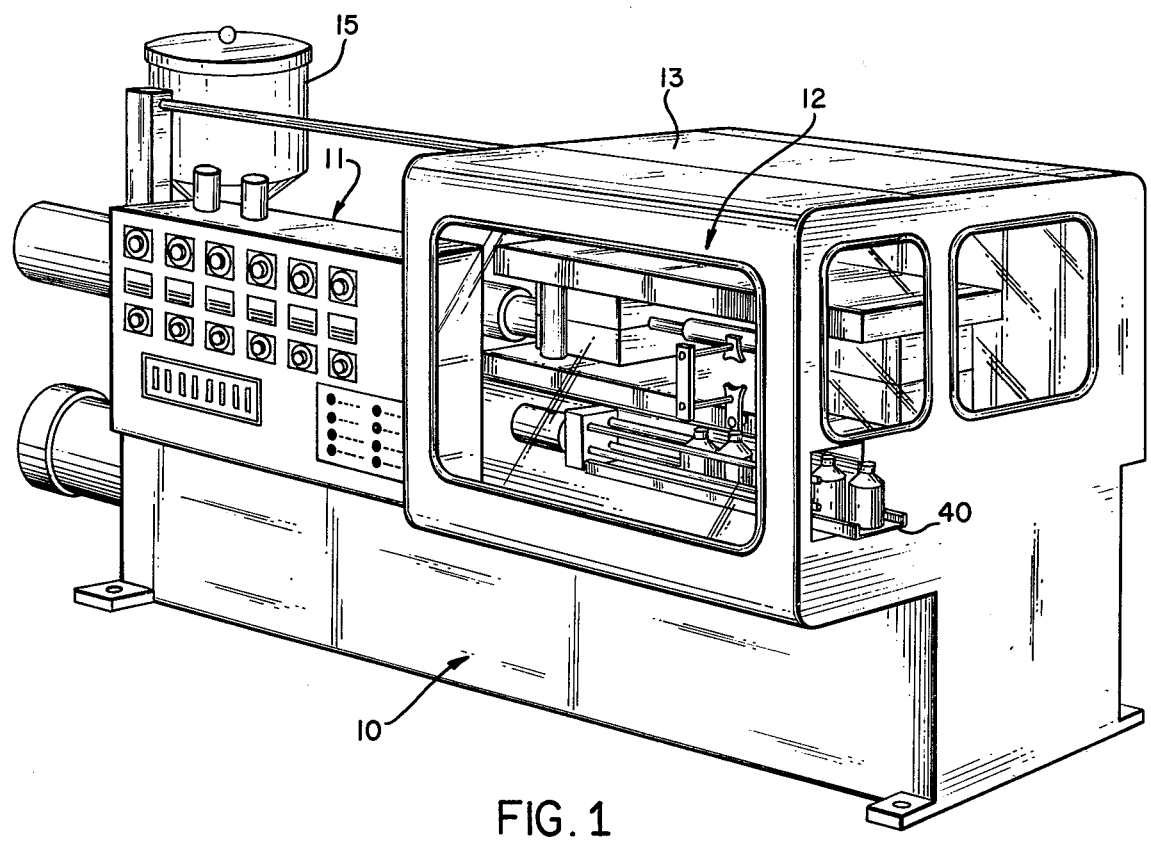
FIG. 1 is a view in perspective of an injection blow molding apparatus in accordance with the invention showing a hood covering the molding stations thereof.

Referring now to the drawings and in particular FIG. 1, there is shown an injection blow molding apparatus for forming containers of plastic material and wherein said apparatus includes a base portion 10, an instrumentation portion 11 and a molding station portion 12, said molding station portion including a hood means 13 to cover the various injection, blow and auxiliary and stripping stations which will be hereinafter described in detail.

Figure 2:
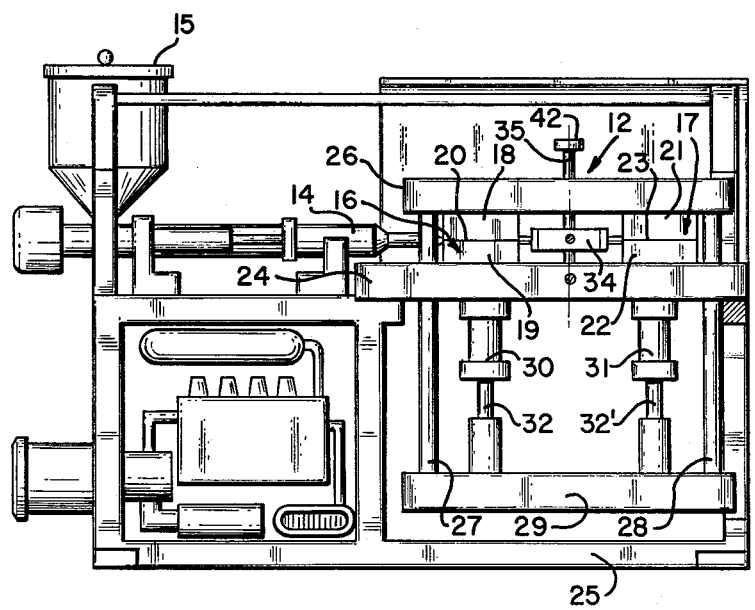
FIG. 2 is a side elevation view in partial section (being taken on line 2—2 of FIG. 3) of the apparatus in FIG. 1 shown without the hood.
Figure 3:
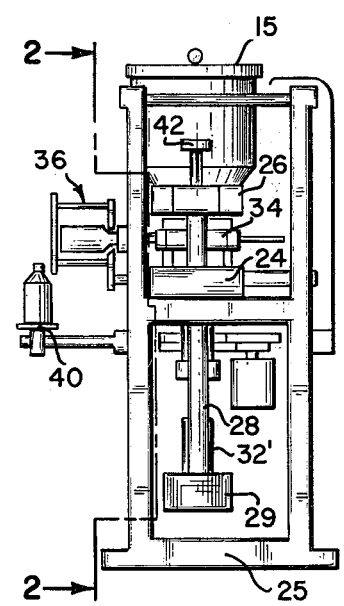
FIG. 3 is a front elevation view of the apparatus in FIG. 1 shown without the hood.
Figure 4:
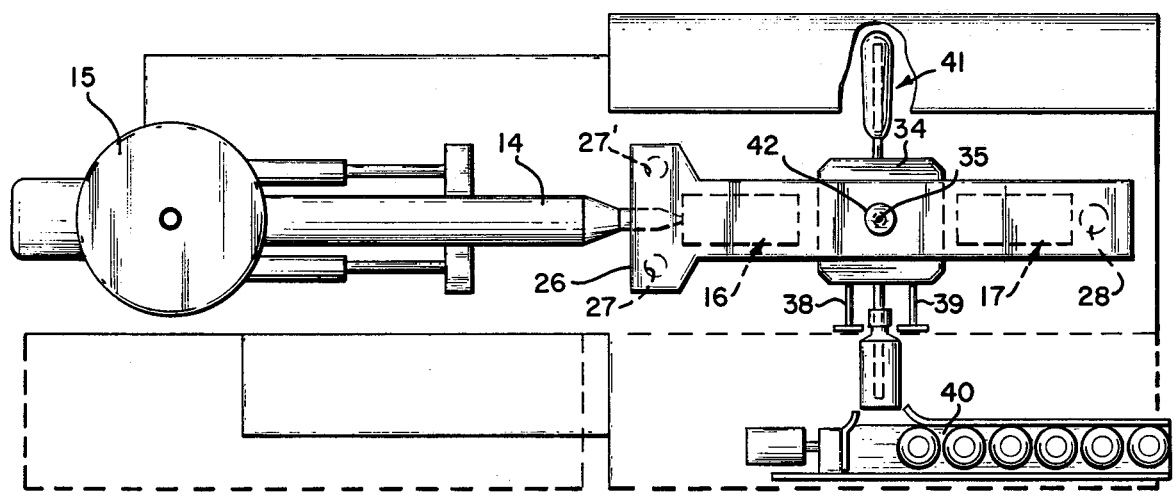
FIG. 4 is a top plan view of the apparatus in FIG. 1 shown without the hood.

Referring now to FIGS. 2, 3 and 4, the apparatus according to the invention includes an extruder 14 with which a thermoplastic materials hopper 15 is associated. The extruder is adapted to communicate with injection mold 16.

Molding portion 12 includes said injection mold 16 and a blow mold 17. Said injection mold has two mold sections 18 and 19 adapted to be separated from each other in a vertical direction along a horizontal parting line 20. Blow mold 17 is also formed of two mold sections 21 and 22, which are likewise adapted to be separated from each other along a horizontal parting line 23. The lower sections 19 and 22 of the injection and blow molds respectively are fixed to a horizontal frame member 24 which is stationary, being mounted on frame 25. The upper sections of the injection and blow molds, namely, sections 18 and 21 respectively, are mounted on upper beam 26 which in turn is supported by shafts 27 and 28 mounted on lower beam 29. Hydraulic cylinders 30 and 31 are connected by piston rods 32 and 32' to lower beam 29.

Core pins 33 of conventional type used in injection blow molding operations are mounted on turret 34 which is mounted for rotation on vertical axle 35. The core pins 33 and turret 34 are connected to a suitable air supply (not shown).

Stripper means 36 is provided to remove blown containers from the core pins 33. Said stripper means 36 can include a container ejection plate 37 (FIG. 9) mounted on extensible rods 38 and 39 (FIG. 8) adapted to move outwardly to withdraw blown containers from said core pins. Conveyor slide 40 is positioned below stripper means 36 to receive the containers removed from the core pins 33.

Referring now to FIG. 4, it can be seen that the core pins 33 are mounted on turret 34 such that there is a radial angle of 90° between each core pin. Injection mold 16 and blow mold 17 are positioned radially from each other 180° with the stripping station being located on one side of the turret between said injection mold 16 and said injection mold 17 at 90° radially from each. Opposite stripping means 36 is an auxiliary station 41, the purpose of which will be discussed hereinafter. Means are included (not shown) for rotating turret 34 sequentially in a clockwise direction from injection mold 16 to auxiliary station 41 to blow mold 17, and finally to stripper means 36. Also included are means (not shown) for actuating hydraulic cylinders 30 and 31, in conjunction with the sequential rotation of turret 34, whereby mold sections 18 and 21 and said turret are moved vertically in a manner to be described.

Figure 5:
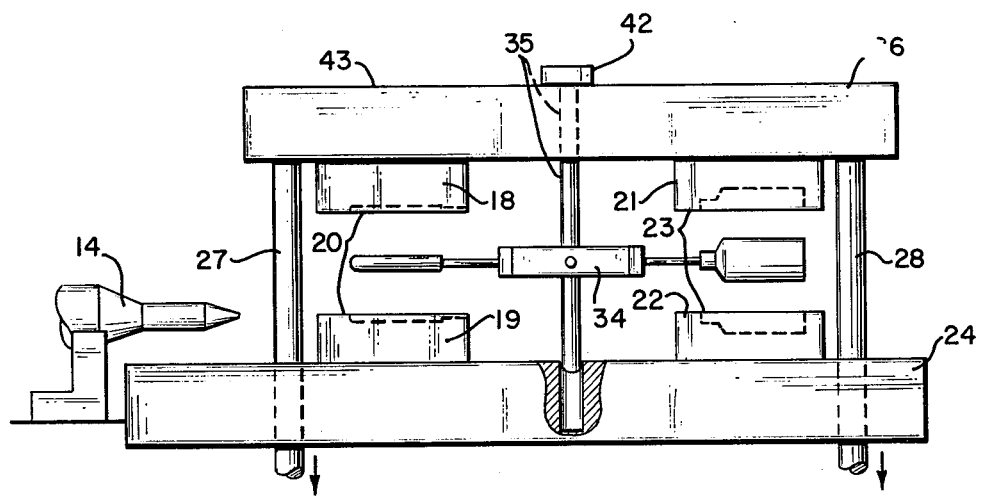
FIGS. 5, 6 and 7 are schematic side elevation views in partial cross section showing the sequence of operation of the mold portions of the apparatus shown in FIG. 1.

Referring now to FIG. 5, and as previously noted, turret 34 is mounted for rotation on vertical axle 35. The vertical axle 35 is journaled in upper beam 26 and horizontal frame members 24. At the top of vertical axle 35 above upper beam 26 is an indexing head bearing 42 positioned above the upper surface 43 of upper beam 26.

Figure 8:
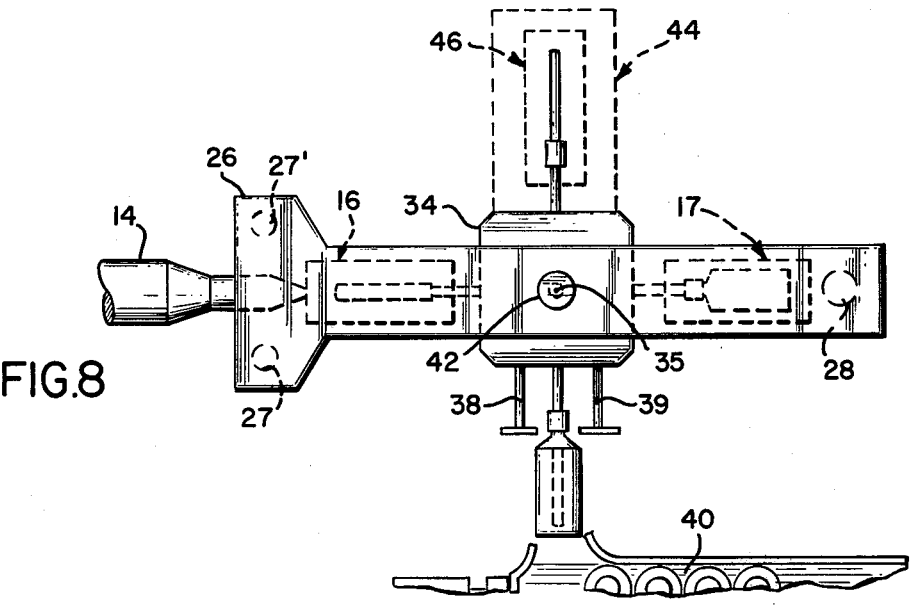
FIG. 8 shows a partial plan view similar to FIG. 3 with parts thereof removed for clarity of illustration showing an alternate modification of the inventive apparatus.
Figure 9:
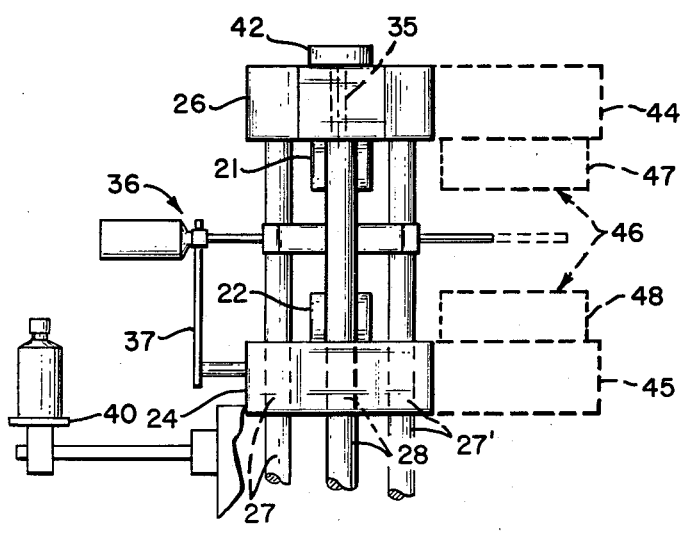
FIG. 9 is a partial front elevation view similar to FIG. 2 with parts thereof broken away for clarity of illustration showing an alternate modification of the inventive apparatus.

FIGS. 8 and 9 illustrate, inter alia, an alternate embodiment of the invention wherein the capabilities of the apparatus can be expanded by introduction at auxiliary station 41 of an additional operation. As illustrated in such Figures, removable extension clamp sections 44 and 45 can be attached to upper beam 26 and horizontal frame member 24, respectively. To these removable extension clamp sections there can be attached, for example, an intermediate blow mold 46 which includes an upper section 47 and a lower section 48.

In operation, the apparatus as described can operate to carry out the method of this invention in the following manner. thermoplastic material in powder or pellet form is loaded into hopper 15 and introduced to extruder 14 wherein it is melted. A core pin 33, is positioned in injection mold 16 and a parison of the thermoplastic material is formed in said mold on the core pin. The core pin with the parison is radially moved 90° in a clockwise direction by rotation of turret 34 to auxiliary station 44. The core pin with the parison is then moved 90° to blow mold 17 in which air is emitted through the core pin to form a plastic container having the contours of said mold. The core pin with the container is again moved 90° to stripper means 36 where extensible rods 38 and 39 are moved outwardly to contact container ejection plate 37 with the shoulder of the blown container to remove it from the core pin.

Figure 6:
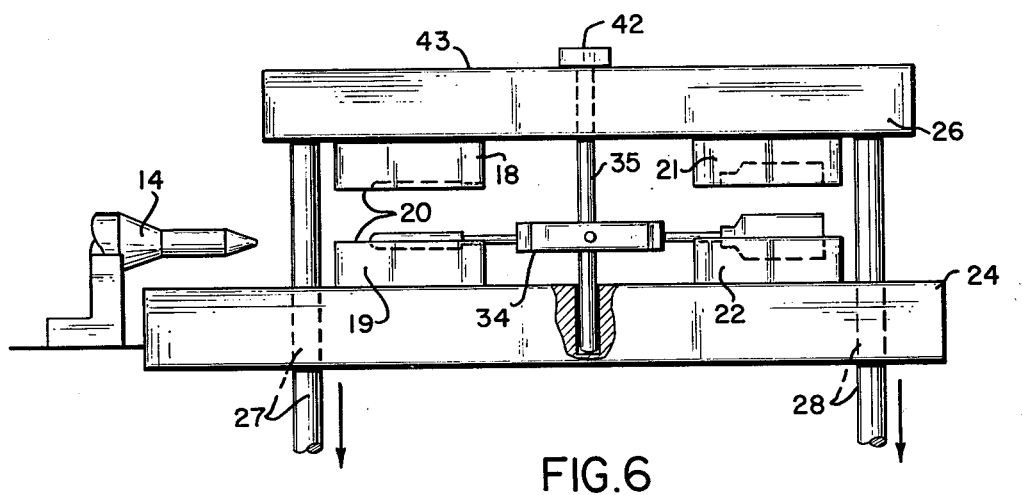
Figure 7:
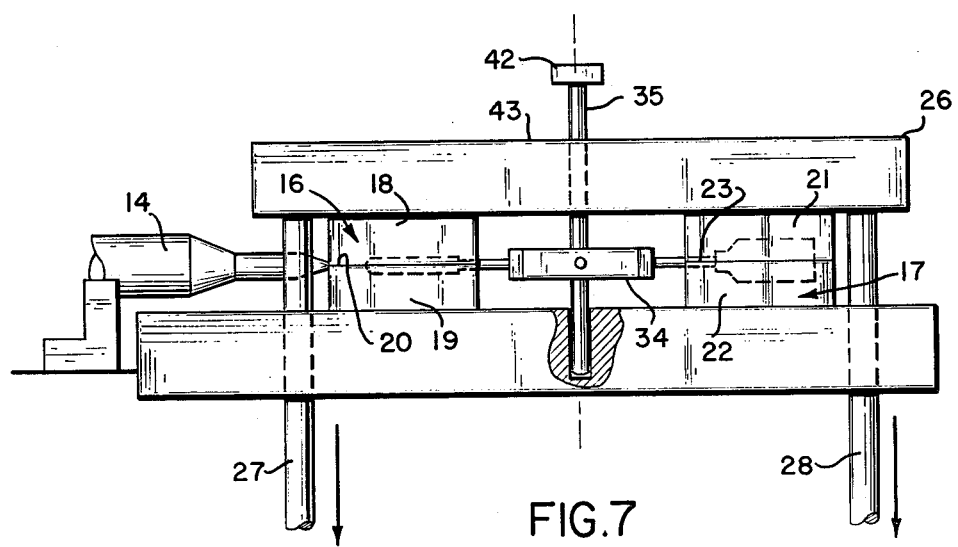

According to an important feature of this invention, core pins 33 are positioned in injection mold 16 and blow mold 17 by first radially alinging said core pins with the mold sections 18 and 19 of the injection molds 21 and 22 of the blow mold 17 when said mold sections are in an open position as shown in FIG. 5. Said core pin is then moved downwardly in a vertical direction by downward movement of turret 34 to contact mold sections 19 and 22 of said injection and blow mold, respectively, as shown in FIG. 6. The upper mold sections 16 and 21 of the injection and blow mold, respectively, are then sequentially moved downward in a vertical direction to close the molds as shown in FIG. 7. It can be seen that upper beam 26 maintains turret 34 and the core pins 33 in an intermediate position between the opened sections of injection mold 16 and blow mold 17 by reason of indexing head bearing 42 being in contact with the upper surface 43 of upper beam 26. When hydraulic cylinders 30 and 31 are actuated to lower the upper beam 26, turret 34 is dropped together with the extending core pins 33 which descend until they are positioned in the lower sections 18 and 21 of the injection and blow molds, respectively. As upper beam 26 continues to descend, the upper sections 18 and 21 of the injection and blow molds respectively are closed upon the core pins already positioned in the lower sections of such molds.

The closing sequence is reversed when opening the molds. In the opening operation, upper beam 26 is first raised, opening molds 16 and 17. As can best be seen in FIG. 7, the upper beam 26 can travel a predetermined distance upward before contacting indexing head bearing 42 at which point turret 34 and core pins 33 are sequentially raised with the continued upward movement of upper beam 26.

The foregoing sequence of operations provides particular advantages of the invention. When opening the molds, the parison has additional time to remain in contact with the heated lower portion of the injection mold thereby adding additional workability to the plastic material. When closing the mold, the core pin has sufficient time to properly align with the lower half of the mold prior to the mold completely closing. If safety equipment is used to interrupt closing if a core pin is misaligned, such equipment has added time, namely, about one-half of the closing time cycle in which to operate. This is a significant improvement over existing injection blow molding apparatus wherein the core pin is positioned simultaneously with the closing of the mold resulting many times in damage to the core pin or the parison due to misalignment.

An important feature of this invention is the provision of an auxiliary section 44. As shown in FIGS. 8 and 9, an intermediate blow mold 46 can, for example, be added at the auxiliary station. It may be desirable to use such a mold for the manufacture of a particular type of container. For example, the cycle time might be reduced for the manufacture of a container which required an extremely long time for the blowing operation. If an intermediate blow mold was used, this time can be divided between the intermediate blow mold 46 and the permanent blow mold 17. An additional advantage is that more extreme cooling may be used in the permanent blow mold if the core pin, when it entered such mold, carries a partially blown container. In order to assure that such partially blown container can be accommodated by the permanent blow mold 17, it is preferred that the intermediate blow mold 46 have dimensions in the blown portion of the container that do not exceed 20% less than the dimensions of the final blow mold.

In addition to the possibility of including an intermediate blow mold 46 at auxiliary station 44, it is also possible to conduct other processing operations at this station. For example, auxiliary equipment can be added for biaxial orientation, stretch or stretch blow operations, or external heating of the parison.

Another important feature of this invention is the combination of the previously described injection blow molding apparatus with a hood means to cover the various injection, blow, auxiliary and stripping operations. In blowing an injected parison, it is desirable that the parison be at a temperature such that the plastic material is in an optimum workability condition. Should the material be allowed to cool too much, the blowing operation may not properly produce a container. To provide the apparatus with a desired versatility as described herein, an auxiliary station has been provided which may or may not be used. In the event the station is not used, the parison will have additional time to cool before it reaches blow mold 17. In a preferred form of the invention, a hood means 13 has been provided so that the ambient air around said auxiliary station can be maintained at optimum conditions and draughts of cold air from a molding strip can be excluded. Heat may be added either from controlled auxiliary sources or from the heat generated in the enclosed space by the injection mold. Additionally, cooling or air conditioning of the enclosed space provided by the hood can be accomplished.

I claim:

1. An injection blow molding apparatus for forming containers of plastic material comprising:
   (a) a plurality of core pins extending radially from an axial mounting boss, said boss being mounted for rotation to permit said core pins to be moved radially in a substantially horizontal plane.
   (b) an injection mold having two mold sections adapted to be separated from each other along a horizontal parting line to open said mold and adapted to be associated with said core pins and an extruder for injection molding plastic parisons into said core pins.
   (c) at least one blow mold cavity formed by two mold sections adapted to be separated from each other along a horizontal parting line to open said cavity and adapted to be associated with said core pins for blow molding a plastic container from said parison material.
   (d) stripper means for removing said blow molded plastic containers from said core pins.
   (e) means for sequentially rotating said core pin boss from said injection mold to said blow mold and then to said stripper means. '(f) means for opening and closing said mold sections including means for opening said mold sections by sequentially moving one of said mold sections in a vertical direction and then moving said core pin in a vertical direction a distance sufficient to allow said core pin to be moved radially in a substantially horizontal plane and means for closing said mold sections by sequentially moving said core pins in a vertical direction to contact one of said mold sections then moving one of said mold sections in a vertical direction to close said mold.

2. An apparatus according to claim 1 wherein said injection mold and said blow mold cavity are spaced to permit the addition of an auxuliary station between them.

3. An apparatus according to claim 1 wherein a single blow mold is used radially spaced from said injection mold about 180°.

4. An apparatus according to claim 1 further comprising hood means to enclose said injection and blow mold whereby controlled temperature and humidity can be maintained around said molds.

5. An apparatus according to claim 2 further comprising an intermediate blow mold at said auxiliary station.

6. An apparatus according to claim 5 further comprising hood means to enclose said injection and blow molds and said auxiliary station whereby controlled temperature and humidity can be maintained around said molds and station.

* * * * *